United States Patent

Grundby et al.

[11] Patent Number: 5,887,618
[45] Date of Patent: Mar. 30, 1999

[54] FLUID FLOW CONTROL VALVE DEVICE

[75] Inventors: Mattias Grundby, Älvsjö; Staffan Hedlund, Skärholmen, both of Sweden

[73] Assignee: AB Rexroth Mecman, Stockholm, Sweden

[21] Appl. No.: 884,275

[22] Filed: Jun. 27, 1997

[30] Foreign Application Priority Data

Jul. 9, 1906 [SE] Sweden .................................. 9602721

[51] Int. Cl.$^6$ ................................................. F15B 13/042
[52] U.S. Cl. ........................................ 137/596.18; 91/465
[58] Field of Search .......................... 137/596.18; 91/465

[56] References Cited

U.S. PATENT DOCUMENTS

| | | | |
|---|---|---|---|
| 4,492,251 | 1/1985 | Blake | 137/596.18 X |
| 4,616,674 | 10/1986 | Bardoll | 137/596.18 |
| 4,617,967 | 10/1986 | Read et al. | |
| 4,643,225 | 2/1987 | Imhof | |
| 4,924,902 | 5/1990 | Lewis et al. | 137/596.18 X |
| 5,361,803 | 11/1994 | Stoll | 137/625.66 |
| 5,487,409 | 1/1996 | Stoll et al. | 137/625.66 X |
| 5,606,993 | 3/1997 | Stoll | 137/596.18 |

*Primary Examiner*—Gerald A. Michalsky
*Attorney, Agent, or Firm*—Townsend and Townsend and Crew LLP

[57] ABSTRACT

A valve device (1) for fluid flow control includes two independent valves comprising two movable valve bodies (4, 5) within two valve spaces (V1, V2), wherein each valve body is controllable against the force of a return spring (7, 8) acting thereon. The invention is distinguished in that the valve spaces (V1, V2) are located axially with respect to each other in one common housing (2, 3), that the housing between the two valve spaces is provided with an essentially fixed separating means (6) against which the two return springs are resting, that the housing comprises a common discharge channel (11) which communicates with the two valve spaces, and that the device comprises a double one-way valve function (9, 10) in the area of the discharge channel in order to prevent unintentional flow actuation resulting from overflow between the valve spaces.

10 Claims, 1 Drawing Sheet

FLUID FLOW CONTROL VALVE DEVICE

BACKGROUND OF THE INVENTION

This invention concerns a fluid flow control valve device.

Such valve devices are previously known, wherein the two separate valves, for controlling for example cooperating consumers in a machine, are placed in two separate valve spaces in separate valve housings. The solution according to the prior art is thereby expensive and complicated since all functions have to be doubled.

SUMMARY OF THE INVENTION

The aim of this invention is to propose a valve device including two independent valves, wherein this problem is eliminated and the production cost is reduced.

This solution results in essentially reduced costs since the functions of two valves may be contained within a common valve housing. By inserting a fixed separating means between the two valve spaces, fluid flow separation is obtained as well as an appropriate fixed counter stay for the two return springs. By arranging double one-way valve function it is assured that the fluid flow from the one valve is incapable of actuating the valve body of the second valve. Such an actuation could otherwise result in that the control of one consumer would erroneously actuate the second consumer.

The invention makes it possible at a great extent to use standard components which considerable reduces the production cost of the device. Further the invention allows simple assembly which likewise contributes to the reduction of the cost.

By the separating means being providing with the double one-way valve function, the fact that the device is simple and easily produced is accentuated.

One feature of the invention concerns a particularly preferred embodiment wherein the two valve spaces are easily separated from the outlet channel and from each other.

Preferred arrangements for fixing the separating means inside the valve housing allow the use of easily produced elements and leading to particularly simply assembly.

Other preferred embodiments, wherein standard type inner sockets are used, leads to simplified and cheaper manufacture since the necessary manufacturing tolerances are obtained in the production of said inner sockets.

Other advantages of the invention will be clear from the following detailed description.

DESCRIPTION OF THE PREFERRED EMBODIMENT

Figure 1:
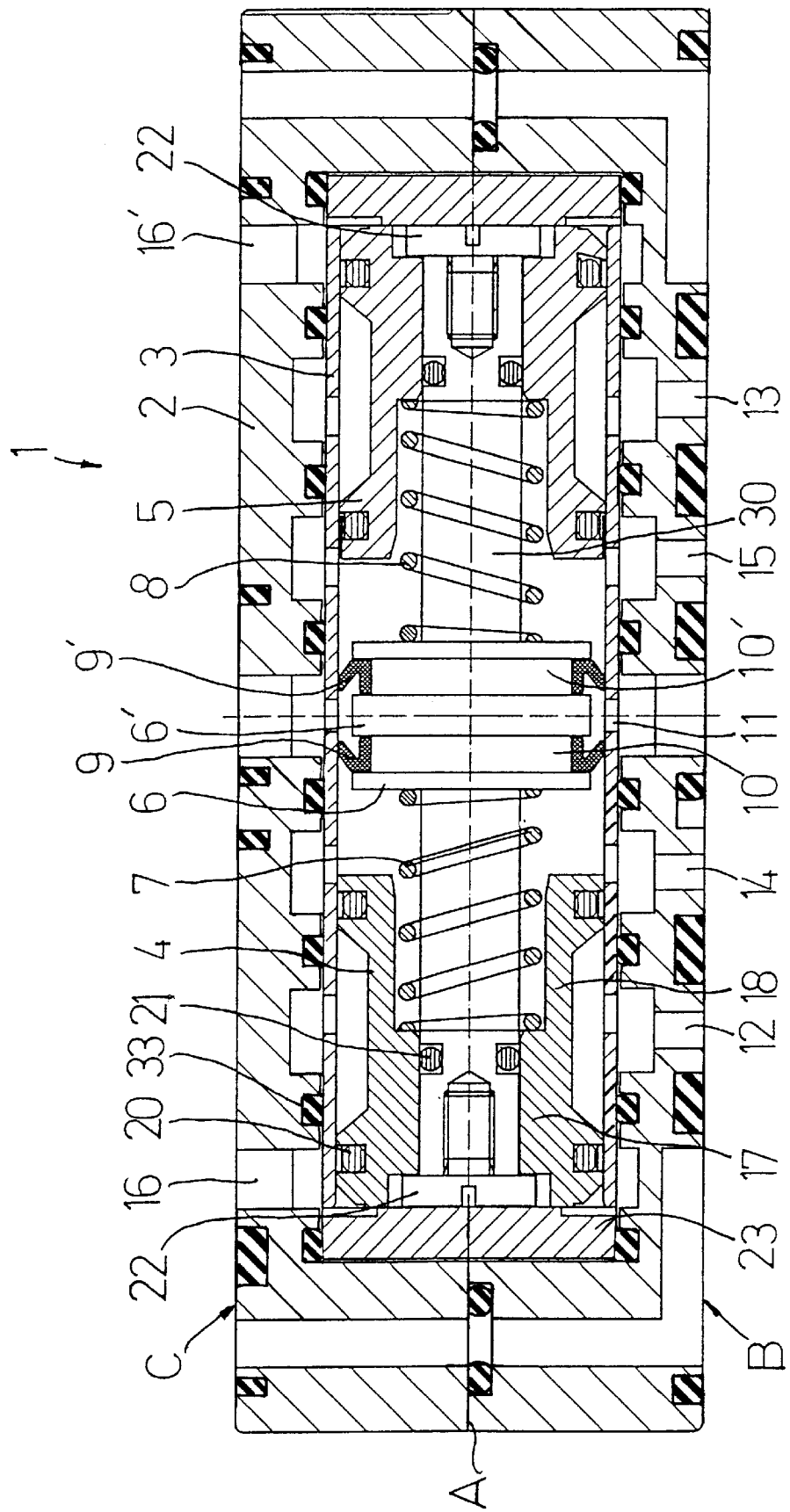
FIG. 1 is a cross-sectional view of a valve device made according to the invention.

Valve devices having two valve bodies placed inside one valve housing are previously known from U.S. Pat. No. 4,643,225, and U.S. Pat. No. 4,617,967. According to these two patents however, a relative actuation between the valve bodies with respect to each other will result, something that is intended to be avoided according to this invention.

The invention will now be described in greater detail at the background of an embodiment and with reference to the annexed FIG. 1 which shows a valve device according to the invention in an axial section.

The valve device 1 shown in FIG. 1 is a double so called 3-2-valve and includes a separable housing 2 which is separable along a separation plane A extending through a central axis, said housing on the inside being provided with a socket 3 which may be of standard type. The socket 3 is provided with the usual ports for pressure fluid, consumer communication and discharge fluid. Inside the socket 3 there are sealingly movable a first valve body 4 and second valve body 5 which are located in two valve spaces V1 and V2 respectively which are placed axially with respect to each other. A separating means 6 is arranged centrally in the housing and is fixed by being fastened to a rod 30 which rests against the axially outer end walls of the housing 2 without having any appreciable possibility of axial movement.

The separating means is radially most outwardly provided with ring-shaped lip seal type sealing means 9 and 9' which are axially separated, and between which one or several discharge channel ports 11 are located. The lip sealing means 9 and 9' allow fluid to flow from the respective valve space V1 and V2 in the direction of the discharge channel port (ports) 11, they prevent however a flow from that area back to the respective valve space V1 and V2. The sealings are thus functioning as one-way valves. The positions of the valve bodies 4 and 5 inside the valve housing is controlled by supply of control fluid into the outer area of the valve spaces adjacent the valve housing end walls through the control pressure ports 16 and 16', respectively, whereby pressurizing a chamber which is located at the end presses the respective valve body in the direction of the separating means 6 against the action of the return spring 7 and 8 respectively. The function of the valve device is thus such that the pressure fluid in, as an example, the port 12 flows into the annular space outwardly the mid portion of the valve body 4, from where, when pressurizing the control pressure port 16, by the displacement of valve body, in the Figure to the right, fluid is delivered through the consumer port 14 to a consumer such as a working cylinder. When releasing the pressure in the control pressure port 16 the valve body 4 is returned because of the spring action of the return spring 7, whereby the consumer port 14 is capable of communicating with the discharge port 11 over the lip seal means 9. During this entire sequence the valve body 5 is unaffected by the spring action of the return spring 7 as well as by the fluid flow through the discharge channel port 11.

It is evident that the valve part to the right in the Figure works in the same way whereby as an example 13 indicates a pressure fluid port and 15 a second consumer port.

More in detail the valve device 1 axially most outwardly on the rod 30 is provided with stop screws 22, which prevent the valve bodies from leaving the rod in the axial direction. This construction simplifies assembly of the valve device since the valve bodies, the rod, springs and socket 3 may be mounted as a unit inside the housing 2.

In order to achieve sealing cooperation with the socket 3, the valve bodies 4 and 5 are in the usually manner provided with sealing rings 20. The seal between the inside of the socket shaped valve bodies 4 and 5 and the rod 30 is provided by sealing rings 21 which are placed in annular recesses in the rod.

Axially most outwardly the valve spaces V1 and V2 are limited by end plates 23 which are shaped so as to allow communication between the control pressure ports 16, 16' and the axially most outwardly located control pressure space in the valve spaces. Sealing cooperation between the socket 3 and the housing 2 is provided by several sealing rings 33 (not all are indicated) thus allowing the housing 2 to be manufactured with reduced demands with respect to precision.

Preferably the ports which are arranged in the socket 3 are comprised of a number of series of circumferentially arranged surrounding holes, which in the inserted position communicate with ring-shaped recesses in the housing 2. In order to be able to fasten the valve device onto fastening plates, manifolds or the like it is provided with the appropriate sealings 31, 32 on the base plane B as well as at the upper plane C.

The invention may be modified within the scope of the annexed claims.

Thus, the invention also embrace a solution where non socket-shaped valve bodies are arranged within the valve spaces V1 and V2. The separating means may in that case be fixed by a locking pin extending radially through the socket and/or the housing. It is also possible to use a divided socket 3 whereby in that case the separating means 6 could have an outer diameter exceeding the inner diameter of the socket allowing it to be fixed, for example by means of an enlarged middle portion 6' between the two sockets.

Other solutions with respect to the one-way valve function is also possible, including one where channels formed in the material of the housing are provided with one-way valves and where a totally sealing separating means is used. A solution having one-way valves located inwardly the separating means is also possible.

Although a solution using one inner socket 3 is most preferred the invention does not leave out a solution where the housing 2 has its inner surfaces in direct sealing cooperation with the valve bodies.

Finally, each valve body according to the shown embodiment comprises a first part 17, which sealingly cooperates with the rod 30 and a second part with an increased inner diameter for the reception of the respective spring 7, 8. This solution result in an axially more compact valve device.

The presence of a common discharge channel communicating with the two valve spaces V1 and V2 also include solutions with separate ports in the respective space V1 and V2.

We claim:

1. Valve device (1) for fluid flow control including two independent valves comprising two movable valve bodies (4, 5) within two valve spaces (V1, V2), wherein each valve body is controllable against the force of a return spring (7, 8) acting thereon, characterized in that the valve spaces (V1, V2) are located axially with respect to each other in one common housing (2, 3), that the housing between the two valve spaces is provided with an essentially fixed separating means (6) against which the two return springs are resting, that the housing comprises a common discharge channel (11) which communicates with the two valve spaces, and that the device comprises a double one-way valve function (9, 10) between the valve spaces and the discharge channel in order to prevent unintentional flow actuation resulting from overflow between the valve spaces.

2. Device according to claim 1, characterized in that the separating means (6) comprises the double one-way valve function (9, 10).

3. Device according to claim 2, characterized in that the separating means (6) radially most outwardly is provided with two axially separated lip seal elements (9, 10), serving as one-way valves, cooperating with the housing (2, 3) wall and being located axially on each side of a discharge channel port (11), whereby the lip seal elements allows flow in the direction of the discharge channel port (11) but not therefrom.

4. Device according to claim 1, characterized in that the separating means (6) is carried by an axially extending rod (30), which is fixed within the valve housing (2, 3) and that at least one of the valve bodies (4, 5) is socket shaped having an inner through hole which is sealed (at 21) against the rod (30).

5. Device according to claim 4, characterized in that the rod (30) rests against the inner axial end walls of the housing (2, 3) and at both valve bodies (4, 5) are socket shaped.

6. Device according to claim 4, characterized in that each one of the valve bodies (4, 5) cooperates with an inner socket (3) which comprises the inner portion of the valve housing.

7. Device according to claim 6, characterized in that the inner socket (3) is common for and extends over both valve spaces (V1, V2).

8. Device according to claim 6, characterized in that the inner socket (3) cooperates sealingly with the remaining part of the housing (2) by means of sealing rings (33).

9. Device according to claim 6, characterized in that the housing outside the inner socket (3) is separable along a plane (A) which extends through its axis.

10. Device according to claim 1, characterized in that the end plates (23) are located axially most outwardly in the valve spaces.

* * * * *